Patented May 11, 1937

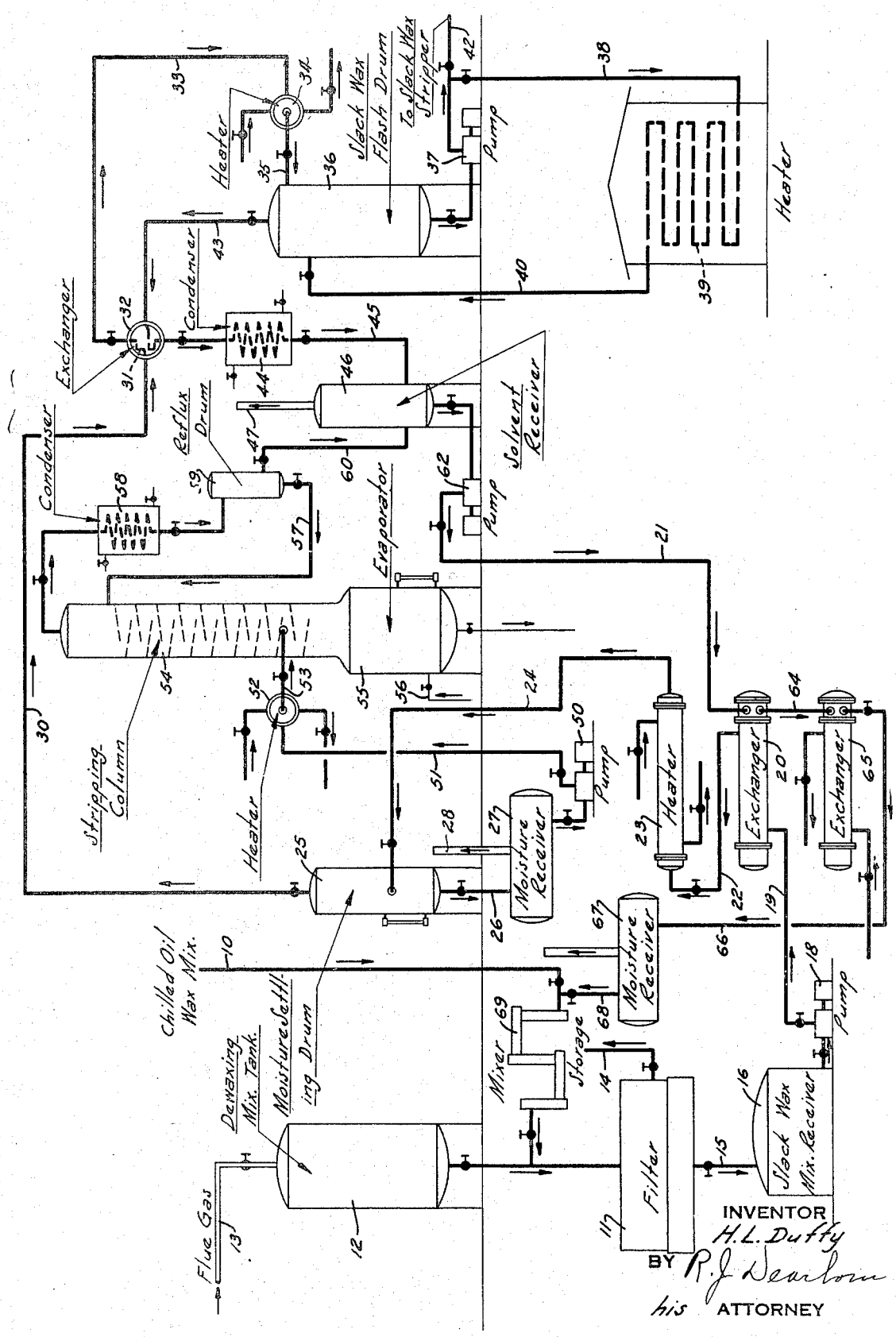

2,080,222

UNITED STATES PATENT OFFICE 2,080,222

SOLVENT RECOVERY IN DEWAXING OPERATIONS

Herbert Lewis Duffy, Sumner, Ill., assignor to Indian Refining Company, Lawrenceville, Ill., a corporation of Maine Application November 14, 1935, Serial No. 49,704

11 Claims. (Cl. 202—39)

This invention relates to the solvent dewaxing of mineral oil, and more particularly to the recovery of solvent from slack wax separated in such a solvent dewaxing process.

In the solvent dewaxing of mineral oil as customarily practiced, the oil to be dewaxed is mixed with a solvent, the oil-solvent mix chilled to precipitate the wax, and the precipitated wax separated by filtration, centrifuging, or cold settling from the resultant dewaxed oil. Some of the solvent employed in the process is retained in the separated slack wax, the bulk of the solvent being retained in the dewaxed oil. Any water present in the system as an impurity freezes out and is separated along with the slack wax. The retained solvent is then generally recovered from both the dewaxed oil and the slack wax by distillation for reuse in the process.

The water present in the slack wax frequently causes difficulty in the recovery of solvent from the slack wax, particularly where a solvent is employed which is miscible or soluble in water. This is true, for example, when dewaxing with a solvent mixture comprising acetone and benzol, or acetone, benzol and toluol, in which case the acetone is soluble in water. If it is attempted to distill off the solvent directly from the slack wax, the water will also be vaporized and passed along with the solvent vapors.

When these vapors are condensed, they will separate into an upper layer containing substantially all the benzol and toluol together with acetone and enough water to saturate this top layer and a lower layer containing water and dissolved acetone. At condenser temperatures of 90° F. to 100° F., a solvent composed of 35% acetone, 52% benzol and 13% toluol, for example, will dissolve about 1½% of water when saturated. In commercial operation, there is always enough moisture present to saturate the solvent and this 1½% of dissolved water seriously interferes with yields, rates of filtration and quality of yield if the solvent is reused without removing the water. It is difficult to separate the dissolved water from the top layer containing benzol, toluol and acetone so as to effect a substantially complete recovery of the solvent, which is desirable in commercial practice in order to reduce solvent loss and render the process commercially economical. On the other hand, if the water is not separated from the system it will gradually accumulate and dilute the solvent and this destroys its effectiveness as a dewaxing solvent.

It is an object of the present invention to provide a method of recovering solvent from slack wax in a dewaxing process of this character and employing a solvent which is miscible with water, in a simple and commercially economical manner, while at the same time effecting a substantially complete recovery of the solvent.

It is a further object of the invention to substantially completely remove water from the recovered solvent, and to do this in a simple and expeditious manner avoiding heat loss.

In the drawing, the single figure is a diagrammatic view of apparatus for carrying out the method of this invention.

In accordance with the present invention, the slack wax-solvent mix separated from the chilled solvent-oil mix is heated to a controlled temperature at which the slack wax-solvent mix becomes thin enough to permit the separated water to settle out. This temperature is substantially the temperature at which the precipitated wax becomes dissolved in the solvent. Until this temperature is reached, the precipitated wax makes the mixture so thick that the particles of water will not settle out although they are separated in the form of small globules distributed throughout the mix. The mixture is allowed to stand at this maintained temperature, whereupon it settles into a lower water layer containing a very small proportion of the solvent, and an upper wax-oil layer containing the major proportion of the solvent. The two layers are then separated as by decantation. The solvent is then recovered from the upper wax-oil layer by distillation. Any small proportion of retained solvent may be recovered from the lower water layer by stripping the same with steam and fractionating the vapors to carry overhead substantially pure solvent uncontaminated with water. This is found feasible where only a small proportion of the solvent is left in the water. The solvent recovered from the two layers may be condensed and combined. The recovered solvent is then chilled to a low temperature approximating the dewaxing temperature to freeze out any small amount of water remaining therein. The chilled solvent, freed of water, is then preferably admixed directly with chilled wax bearing mix passing to the filters or other wax separating means. Preferably, the recovered solvent from the distillation and condensing zone is passed in heat exchanging relationship with the slack wax from the wax filters or wax separating zone in order to heat the slack wax and at the same time cool the solvent.

Referring to the drawing, which illustrates apparatus for carrying out a preferred embodiment of the invention, chilled oil-wax bearing mix to be filtered is passed by line 10 from the chillers (not shown) to the filter 11. A surge tank 12 is provided to take care of fluctuating rates of feed and filtration. A gas pressure is maintained on the liquid in surge tank 12 by the introduction of flue gas through line 13. The dewaxed oil passes from filter 11 through line 14 to suitable storage for recovery of the bulk of the solvent which is retained therein. The slack wax is discharged from filter 11 through line 15 to receiver 16.

By way of example, the present invention is described in connection with the acetone-benzol dewaxing process, as illustrated in the patent to Govers No. 1,802,942. In this process, the oil to be dewaxed is preferably mixed with about three to four volumes of solvent comprising about 35% acetone and 65% benzol. Or a solvent mixture of acetone, benzol and toluol may be employed. The benzol and toluol are not miscible with water and little difficulty is experienced in their recovery. However, the acetone is miscible and soluble in water and is representative of a solvent of the class embraced herein, in which difficulty is experienced in recovering the solvent free from water. While the invention is particularly described in connection with the recovery of acetone and benzol from slack wax, it is to be understood that it is not confined to this particular solvent mixture, but is applicable more generally to solvents or solvent mixtures which contain a constituent or constituents miscible with or soluble in water to a certain extent at normal operating temperatures. For example, the invention may be applied to other ketones such as methyl ethyl ketone, hexone or methyl isobutyl ketone, etc., and to mixtures thereof with benzol, toluol and the like.

In accordance with the present invention, the slack wax is pumped from receiver 16 by pump 18 through line 19 to heat exchanger 20, where it is passed in heat exchanging relationship with hot recovered solvent introduced by line 21. This serves to heat the slack wax while concurrently cooling the recovered solvent. The preliminarily heated slack wax then passes by line 22 to steam heater 23 where it is heated to a controlled temperature at which the wax and retained oil have a greater affinity for the water soluble solvent, in this case acetone, than has water which may be present therein. The heated slack wax then passes by line 24 into an intermediate portion of a settling drum 25. Here the mix is allowed to stand and settle into an upper wax-oil layer containing a major proportion of the solvent and a lower water layer containing a very small proportion of the water soluble constituent. In the case of the acetone-benzol dewaxing process, it is found that by heating the slack wax to a temperature of the order of 88° F., and allowing the slack wax to stand at this temperature, the lower water layer which separates out contains about 25% of acetone, the bulk of the acetone and substantially all of the benzol being retained in the upper wax-oil layer. The lower water layer may be withdrawn continuously or periodically through line 26 into receiver 27 provided with vent 28.

The wax-oil layer, separated from the bulk of the water, overflows from drum 25 and passes by line 30 through heat exchanger coil 31 in vapor heat exchanger 32, and then by line 33 through exhaust steam heater 34, and finally by line 35 into slack wax flash drum 36. Slack wax from the bottom of drum 36 is withdrawn by pump 37 and passed by line 38 through heating coil 39 positioned within a suitable furnace, and then returned by line 40 to the upper vapor portion of drum 36. In this manner, most of the solvent is flashed off from the wax. A portion of the stream passing through line 38 is diverted through line 42 to a steam stripping zone (not shown), where remaining solvent is removed from the slack wax. The slack wax is then passed to a receiver for storage or further treatment. As this portion of the apparatus is conventional and forms no part of the present invention, further description and illustration thereof is thought unnecessary. Solvent vapors flashed off in drum 36 pass by vapor line 43 through heat exchanger 32, then into water cooled condenser 44 where they are condensed, and flow by line 45 into solvent receiver 46 equipped with vent 47.

The lower water layer containing a small proportion of solvent, such as acetone, is withdrawn from receiver 27 by pump 50 and forced through line 51 through steam heater 52 and then introduced by line 53 into an intermediate portion of stripping column 54. The stripping column 54 surmounts an evaporator chamber 55 into which steam is introduced by line 56. The steam passing upwardly through the heated water containing acetone serves to strip the acetone therefrom substantially completely, and the stripped vapors of acetone and steam pass upwardly through the column 54 countercurrent to a descending stream of reflux introduced by line 57. This serves to condense most of the steam, so that mainly acetone passes overhead to water cooled condenser 58 where it is condensed, and then flows into reflux drum 59. A portion of the condensed liquid is returned by line 57 from the bottom of drum 59 to the stripping column 54 to serve as reflux therein, and the balance overflows by line 60 from an intermediate portion of drum 59 to solvent receiver 46.

The combined solvent is withdrawn from receiver 46 by transfer pump 62 and forced through line 21 to heat exchanger 20 where it is cooled. The cooled solvent then passes by line 64 to chiller 65 where it is refrigerated to a low temperature approximating the dewaxing temperature. For example, it may be chilled to about −10 to −20° F. The chilled solvent then passes by line 66 to a receiver 67, where any moisture remaining in the solvent and which was frozen out in chiller 65 is separated. The chilled solvent freed of moisture then passes by line 68 into line 10 where it meets the chilled oil-wax mix, and these are thoroughly mixed by passing through a suitable turbulent flow mixer 69 before being introduced into filter 11 or the surge drum 12. In this manner, the chilled solvent is returned to the system at a point where the temperature of the system approximates that of the solvent, avoiding heat or refrigeration loss.

Obviously, many modifications and variations of the invention, as hereinbefore set forth, may be made without departing from the spirit and scope thereof and only such limitations should be imposed as are indicated in the appended claims.

I claim:

1. In the dewaxing of mineral oil, wherein the oil to be dewaxed is mixed with a solvent comprising acetone, the mixture chilled to precipitate wax, and the resultant slack wax with retained oil and solvent is separated from the oil; the method of recovering retained solvent from the separated slack wax, which comprises heating the slack wax to a controlled temperature at which the wax becomes dissolved in the retained solvent, allowing the mixture to stand at the controlled temperature to settle into a bottom water layer containing a minor proportion of dissolved acetone, and an upper wax-oil layer containing the major proportion of the solvent, separating the layers, and then recovering the solvent from the separated wax-oil layer.

2. The method of claim 1, in which the slack wax is heated to a temperature of the order of 88° F.

3. The method of claim 1, in which the separated water layer is subjected to stripping with steam and the resultant vapors fractionated to separate retained actone from the water, and the separated acetone returned to the system.

4. The method of claim 1 in which the slack wax is heated by heat interchange with recovered solvent.

5. The method of claim 1 in which the solvent is recovered from the separated wax-oil layer by distillation, retained solvent in the bottom water layer is recovered by steam stripping, the recovered solvents combined and chilled to freeze out any remaining water therein, and the chilled solvent freed of water returned to the system.

6. The method of claim 1 in which the solvent is recovered from the separated wax-oil layer by distillation, recovered solvent is returned in heat exchanging relationship with slack wax to heat the slack wax and cool the recovered solvent, and the cooled solvent is then chilled to freeze out any remaining water therein prior to return to the system.

7. The method of claim 1 in which the solvent is recovered from the separated wax-oil layer by distillation, the resultant solvent vapors condensed, the condensed solvent chilled to freeze out any remaining water therein, and the chilled recovered solvent introduced into and mixed with the chilled oil-solvent mix passing to the wax separation step.

8. In the dewaxing of mineral oil, wherein oil to be dewaxed is mixed with a solvent comprising a constituent which is soluble in water at normal temperatures but which is primarily retained in wax and oil as opposed to water at elevated temperatures, the oil-solvent mix chilled to precipitate wax, and the resultant slack wax with retained oil and solvent is separated from the oil; the method of recovering retained solvent from the separated slack wax, which comprises heating the slack wax to a controlled temperature at which the wax becomes dissolved in the retained solvent, allowing the mixture to stand at the controlled temperature to settle into a bottom water layer containing a minor proportion of the solvent constituent dissolved therein, and an upper wax-oil layer containing the major proportion of the solvent, separating the layers, and then recovering the solvent from the separated wax-oil layer.

9. The method of claim 8, in which the separated water layer is subjected to stripping with steam and the vapors fractionated to separate retained solvent constituent from the water, and the separated solvent constituent returned to the system.

10. The method of claim 8 in which the slack wax is heated by heat interchange with recovered solvent.

11. The method of claim 8 in which solvent is recovered from the separated wax-oil layer by distillation, the solvent vapors condensed, the condensed solvent chilled to freeze out any remaining water, and the chilled recovered solvent returned to the system.

HERBERT LEWIS DUFFY.